US007903673B2

(12) United States Patent  (10) Patent No.: US 7,903,673 B2
Chavda                     (45) Date of Patent:     Mar. 8, 2011

(54) INTELLIGENT APPLICATION MANAGEMENT STRATEGY

(75) Inventor: Kavita Chavda, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 11/345,886

(22) Filed: Feb. 2, 2006

(65) Prior Publication Data

US 2007/0177507 A1    Aug. 2, 2007

(51) Int. Cl.
    *H04L 12/24*    (2006.01)
(52) U.S. Cl. ......... 370/401; 370/419; 370/463; 709/203; 709/223
(58) Field of Classification Search .......... 370/401, 370/235, 229, 230, 230.1, 231, 400, 419, 370/420, 463; 726/11, 5; 709/201–203, 709/223
See application file for complete search history.

(56) References Cited

U.S. PATENT DOCUMENTS

| 5,872,915 | A  * | 2/1999 | Dykes et al. ................. 726/5 |
| 5,892,905 | A  * | 4/1999 | Brandt et al. ................ 726/11 |
| 6,175,869 | B1 * | 1/2001 | Ahuja et al. ................ 709/226 |
| 6,189,095 | B1 * | 2/2001 | Coppersmith et al. ........ 713/150 |
| 6,353,608 | B1 * | 3/2002 | Cullers et al. ............... 370/352 |
| 6,405,251 | B1 * | 6/2002 | Bullard et al. .............. 709/224 |
| 6,446,200 | B1 * | 9/2002 | Ball et al. ..................... 713/1 |
| 6,480,748 | B1 * | 11/2002 | Gerszberg et al. ............. 700/21 |
| 6,542,500 | B1 * | 4/2003 | Gerszberg et al. ............ 370/354 |
| 6,766,407 | B1   | 7/2004 | Lisitsa et al. |
| 6,816,903 | B1 * | 11/2004 | Rakoshitz et al. ............ 709/226 |
| 6,925,488 | B2 * | 8/2005 | Bantz et al. ................... 709/206 |
| 6,950,848 | B1 * | 9/2005 | Yousefi'zadeh .............. 709/203 |
| 6,954,786 | B1 * | 10/2005 | Vered et al. .................... 709/223 |
| 7,043,563 | B2 * | 5/2006 | Vange et al. .................... 709/245 |
| 7,111,163 | B1 * | 9/2006 | Haney ........................... 713/153 |
| 7,310,730 | B1 * | 12/2007 | Champagne et al. ......... 713/163 |
| 7,426,181 | B1 * | 9/2008 | Feroz et al. ................... 370/232 |
| 7,548,969 | B2 * | 6/2009 | Tripp et al. .................... 709/223 |
| 7,565,684 | B2 * | 7/2009 | Fiedler et al. ..................... 726/1 |
| 2001/0052052 | A1 * | 12/2001 | Peng .............................. 711/133 |
| 2003/0046126 | A1   | 3/2003 | Flores et al. |
| 2003/0093310 | A1   | 5/2003 | Macrae |
| 2004/0186603 | A1   | 9/2004 | Sanford et al. |
| 2004/0196787 | A1   | 10/2004 | Wang et al. |
| 2004/0221088 | A1   | 11/2004 | Lisitsa et al. |
| 2005/0044197 | A1   | 2/2005 | Lai |
| 2005/0188071 | A1   | 8/2005 | Childress et al. |
| 2006/0112188 | A1 * | 5/2006 | Albanese et al. ............. 709/238 |
| 2006/0184999 | A1 * | 8/2006 | Guichard et al. ................. 726/3 |

OTHER PUBLICATIONS

APM Advisors, Application Front Ends Industry Overview, Oct. 2004.*

Nye, Jr., R. L., "Traffic Management: Calling All Cops," VON Conference and Expo, Fall 2005, www.intarchitect.com/shared/article/showArticle.jhtml?articleId+22103327, pp. 1-6.

(Continued)

*Primary Examiner* — Pankaj Kumar
*Assistant Examiner* — Duc T Duong
(74) *Attorney, Agent, or Firm* — Anna L. Linne; Hoffman Warnick LLC (57) ABSTRACT

The present invention provides a method, system, and computer program product for providing a network-based software application to a customer that includes providing the application at a service provider's site, providing over the network access to the application to a customer's site, and providing traffic management function(s) at either, or both, of an application front end (AFE) and an application internet gateway (AIG) that are located at the provider's and customer's sites, respectively.

16 Claims, 4 Drawing Sheets

OTHER PUBLICATIONS

"Traffic Management or It's About the Application not the Bits!" APM Advisors, Aug. 2004, pp. 1-11.

* cited by examiner

INTELLIGENT APPLICATION MANAGEMENT STRATEGY

FIELD OF THE INVENTION

The present invention generally relates to network-based application management, and more specifically relates to an improved intelligent application management strategy that can be applied in network and utility traffic management systems.

BACKGROUND OF THE INVENTION

Currently, network-based applications are available to users, customers, clients, etc. ("client") over a network be it the Internet, wide area network ("WAN"), and the like, from an application provider ("provider").

Typically, in order to improve the quality of the application that is offered and available to the client, access to the application is provided over the network via a virtual private network ("VPN"). Whether a VPN is employed or not, there are inherent shortcomings this type of application delivery model. The quality of the network-based application is inevitably diminished by various factors including, but not limited to, bandwidth problems, latency, jitter, and packet loss.

Often, the application provider, in providing various network-based application(s), seeks ways to distinguish their services (i.e., providing network-based applications) over competitor providers. That is, besides providing the de facto application to the client, providers enlist various enhancement tools, components, or methods, prior to the providing of the application, during the providing of the application, and as an ongoing service to the customer (e.g., a type of feedback mechanism) in order to offer an enhanced service over their competitors.

Currently, application providers may offer tools such as pre-delivery assessment (i.e., analyzing existing customer IT infrastructure and processes) and determining between existing capability and desired outcomes. The provider may also implement a consolidation of the customer architecture in order to help optimize the basis for service capabilities of the provider's demand management platform.

While helpful, these current methodologies do not necessarily optimize service solutions for the customer. Thus, a need exists for improving or optimizing a service solution to the customer.

SUMMARY OF THE INVENTION

The present invention provides a method, system, and computer program product for providing network-based application software to a customer. By providing one, or more, traffic management functions instead at either an application front end (AFE) and/or an application internet gateway (AIG), an improved application management strategy is obtained. Ultimately, the customer is provided an improved network-based application and services therewith.

A first aspect of the present invention is directed to a method for providing a network-based application to a customer, comprising: providing an application at a service provider site, the site including an application front end (AFE); providing access over a network to the application for at least one customer, located at a customer site, the customer site including an application internet gateway (AIG); and providing at least one traffic management function at one of the AFE and the AIG.

A second aspect of the present invention is directed to a system for providing a network-based application to a customer, comprising: a system for providing an application at a service provider site, the site including an application front end (AFE); a system for providing access over a network to the application for at least one customer, located at a customer site, the customer site including an application internet gateway (AIG); and a system for providing at least one traffic management function at one of the AFE and the AIG.

A third aspect of the present invention is directed to a program product stored on a computer readable medium for providing a network-based application to a customer, the computer readable medium comprising program code for performing the steps of: providing an application at a service provider site, the site including an application front end (AFE); providing access over a network to the application for at least one customer, located at a customer site, the customer site including an application internet gateway (AIG); and providing at least one traffic management function at one of the AFE and the AIG.

A fourth aspect of the present invention is directed to a method for deploying an application for providing a network-based application to a customer, comprising: providing a computer infrastructure being operable to: provide an application at a service provider site, the site including an application front end (AFE); provide access over a network to the application for at least one customer, located at a customer site, the customer site including an application internet gateway (AIG); and provide at least one traffic management function at one of the AFE and the AIG.

A fifth aspect of the present invention is directed to computer software embodied in a propagated signal for providing a network-based application to a customer, the computer software comprising instructions to cause a computer system to perform following functions: providing an application at a service provider site, the site including an application front end (AFE); providing access over a network to the application for at least one customer, located at a customer site, the customer site including an application internet gateway (AIG); and providing at least one traffic management function at one of the AFE and the AIG.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

It is assumed that the reader has an understanding of UMI, WAN, network management, utility metering, traffic management, and the like, commensurate with one skilled in the art. Therefore, a detailed description of these items referenced in the present disclosure will not be provided herein.

Universal Management Infrastructure ("UMI"), offered by the assignee of the present invention, manages customers' IT infrastructure remotely—automatically bringing servers and storage online, correcting problems, and scaling to meet demand. UMI is an infrastructure that supports utility computing systems. Some of the underlying concepts of UMI are similar to those underlying a phone company infrastructure, which supports services like local and long distance calls, Internet service, and DSL (digital subscriber line) service. The infrastructure has enough capacity to cope with variation in demand and provides stability for the services. UMI builds an environment that provides stability for the on-demand services ("ODSs") by coping with fluctuating resource needs. It is also meant to promote autonomic behavior of the ODSs so that when they deviate from expected behavior of performance, they can be corrected and brought back to normalcy. This correction is effected by constant monitoring of ODSs and application of prespecified policies when conditions deviate.

The present invention offers a way to improve the delivery and performance in delivering of a network, or web-based, application to a customer.

Figure 1:
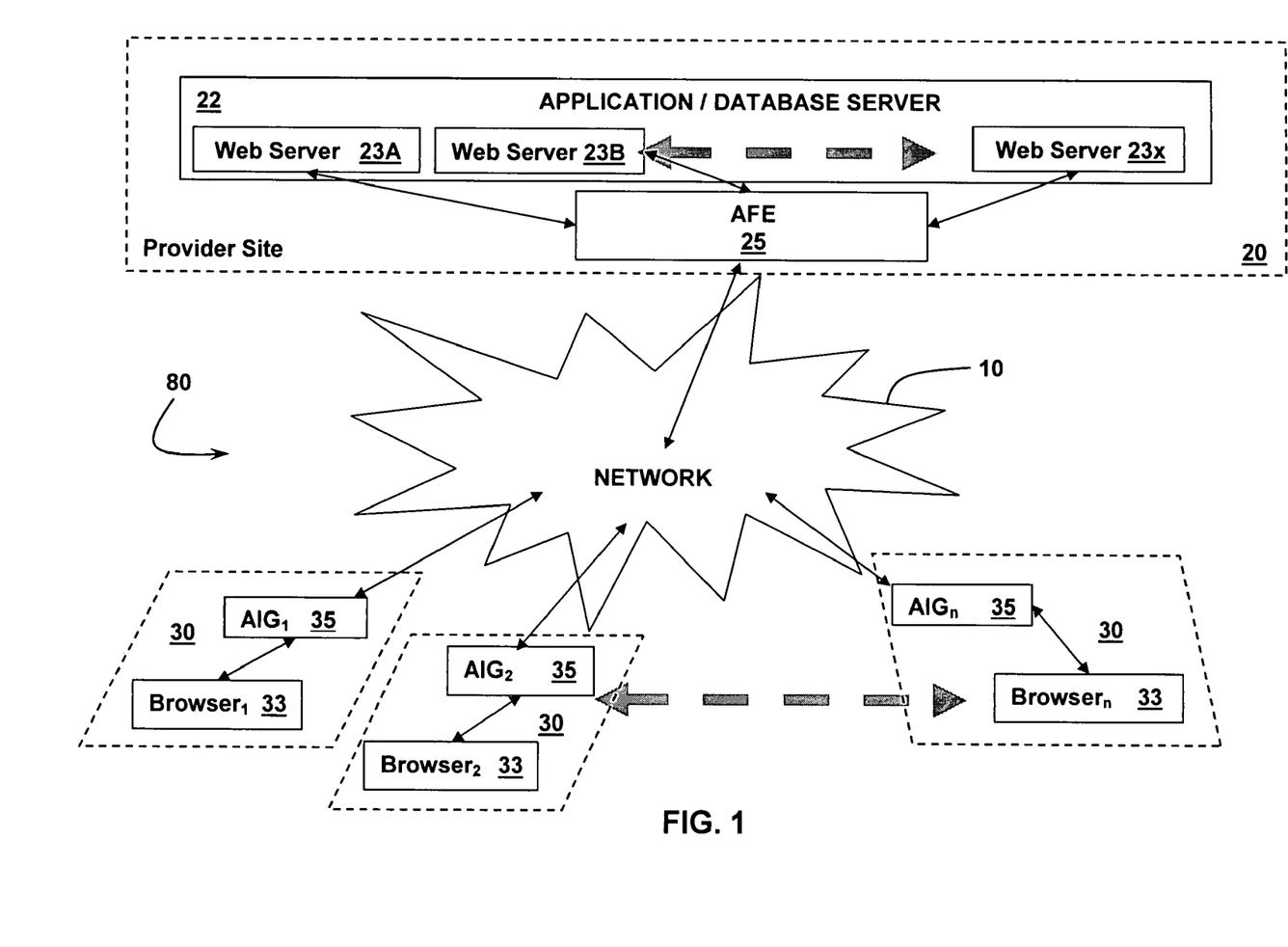
FIG. 1 depicts a system network diagram for delivering a network-based application in accordance with an embodiment of the present invention.
Figure 2:
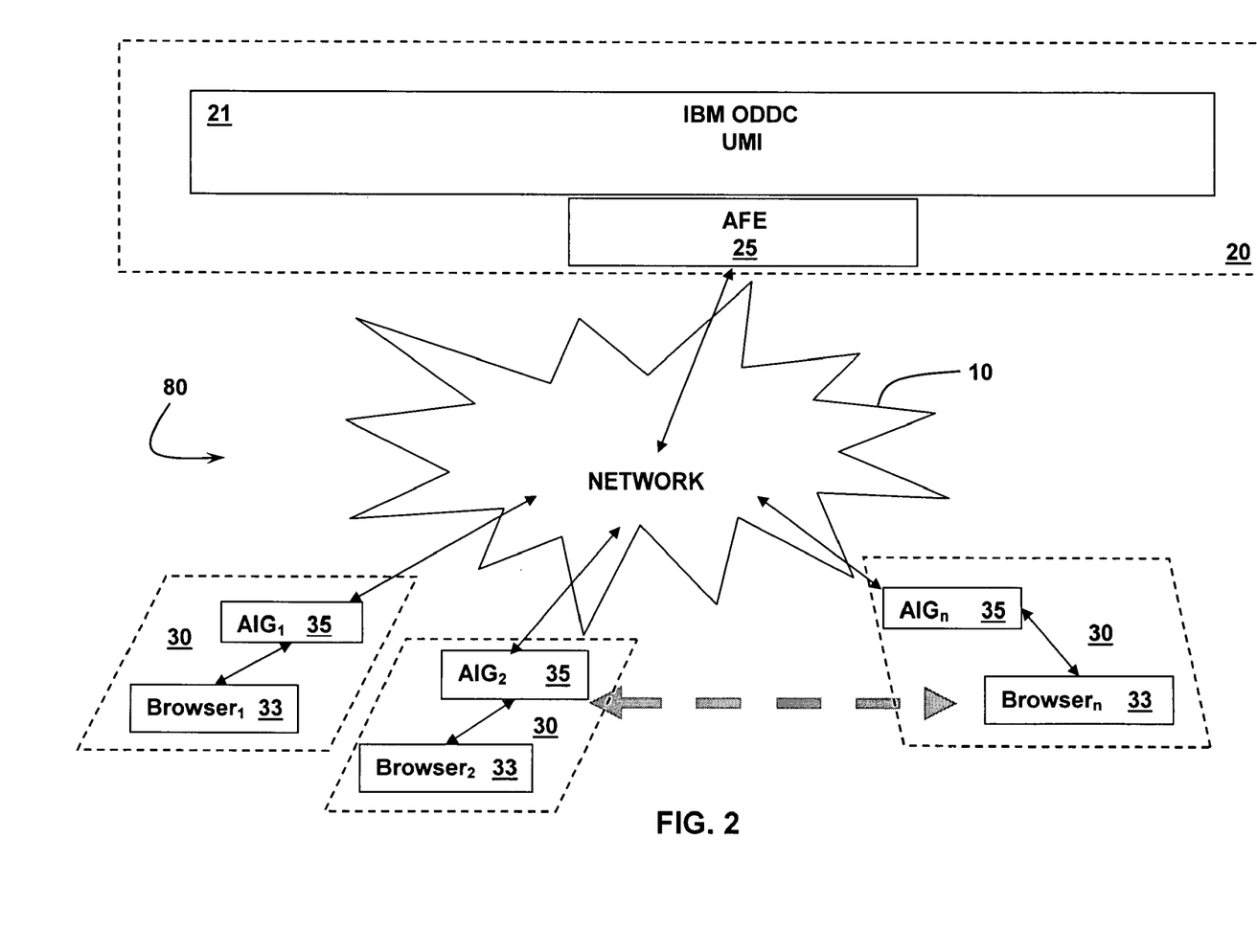
FIG. 2 depicts a system network diagram for delivering a network-based application in accordance with an embodiment of the present invention.

FIGS. 1 and 2 depict two embodiments of system networks 80 that include, in the case of FIG. 1, a network 10, a plurality of client sites 30, and a provider site 20. The provider site 20 is a physically at a location that is distinct from the plurality of clients sites 30. Provider site 20, for example, may be located in Columbus, Ohio, while each of the client sites 30 are located in continents other than North America. Similarly, the client sites 30 may be located adjacent to each other and/or adjacent to the provider site 20.

A provider via provider site 20 provides software (e.g., application software) through network 10 to at least one customer at a client site 30.

Network 10 may be a wide-area network (WAN) such as the Internet, and may further include at least one virtual private network (VPN). Each client site 30 includes at least one browser 33 and an application internet gateway ("AIG") 35. Communication from client site 30 to the network 10 is via AIG 35.

Provider site 20 includes an application, or database, server 22 that includes, typically, a plurality of web servers 23A, 23B . . . 23x. The plurality of web servers 23 may be in a server cluster. Provider site 20 includes an application front end ("AFE") 25 wherein the communication between the web servers 23, to the network 10 is via AFE 25.

A particular embodiment of network system 80 is depicted in FIG. 2, wherein provider site 20 includes IBM's On Demand Data Center ("ODDC") that houses a Universal Management Infrastructure 21 ("UMI"). UMI 21 creates a utility infrastructure and toolset within a data center from which infrastructure services are delivered to a plurality of customers.

By providing various traffic management elements via a traffic management system 50 (FIG. 3) at either the AFE 25, or AIG 35, or both, an enhanced application strategy is created. This strategy inter alia allows for the customer(s) to get optimized network-based applications and services. This strategy includes identifying a "baseline" web services solution for the particular customer. This solution utilizes a service provider infrastructure. The provider then receives requirement(s) specific to that particular customer. The requirement(s) may include, for example: response time, availability, business performance, and combinations thereof. The provider then incorporates modification(s) into the "baseline" web services solution so as to meet these requirement(s). Then, the provider provides this "baseline" web service solution with the modification(s) incorporated to the customer.

Figure 3:
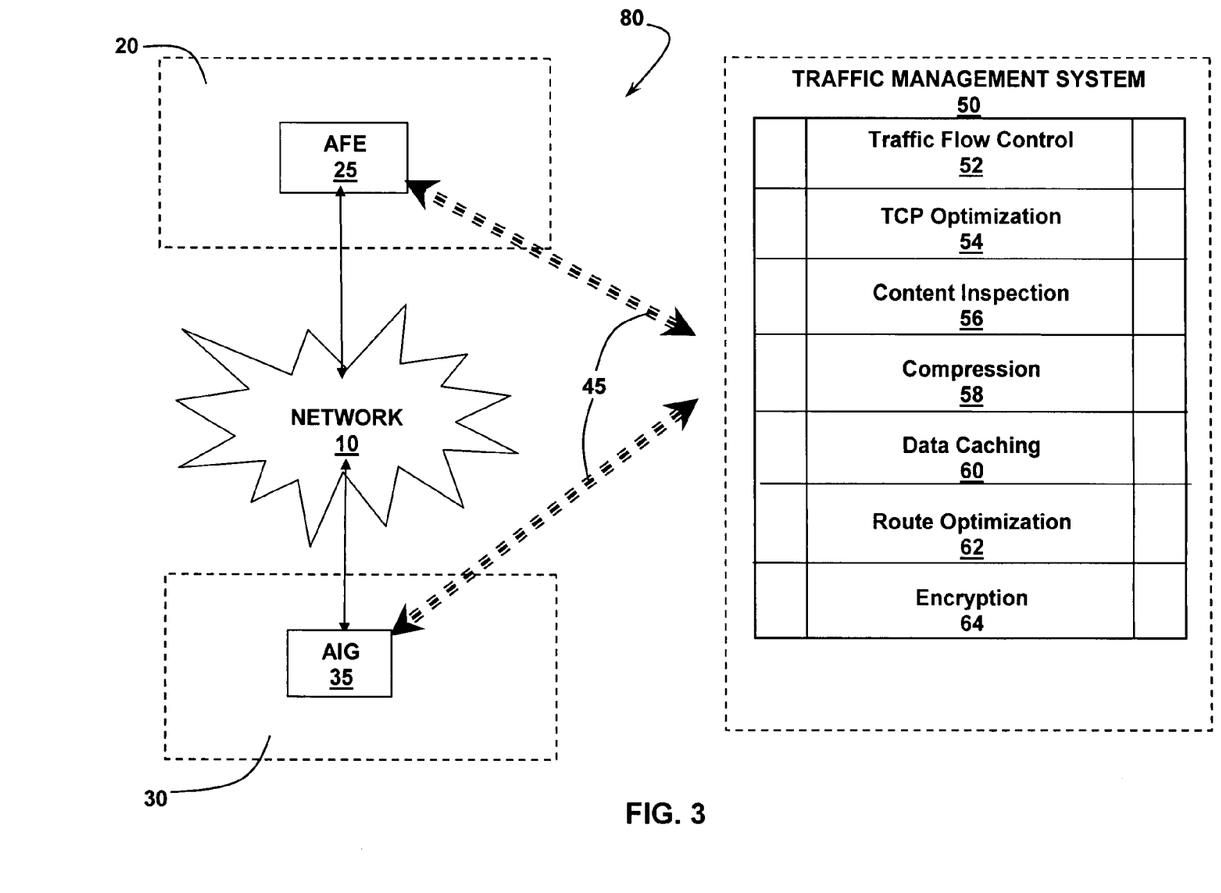
FIG. 3 depicts a traffic management system in communication with a network for delivering a network-based application in accordance with an embodiment of the present invention.

FIG. 3 depicts the interaction of a traffic management system 50 in communication with a system 80 for delivering a network-based application to a customer. For simplicity of illustration, only a single customer site 30, network 10, and provider site 20 is depicted. Clearly, any of the aforementioned singular elements may be plural.

Shown is an Application Front End (AFE) 25 at the provider site 20 and an Application Internet Gateway (AIG) 35 at the customer site 30. For simplicity of illustration, other elements besides AFE 25 and AIG 35 that are part and parcel of the provider site 20 and customer site 30 are not shown.

Thus, the traffic management system 50 interacts and applies its various elements to two locations in the system 80, namely at the AFE 25 and AIG 35 as denoted by arrows 45. At a minimum, a single traffic management element can be applied to the AFE 25 and AIG 35. Conversely, upwards of seven, or more, distinct traffic management elements can be applied to the AFE 25 and AIG 35. The plurality of available traffic management elements include traffic flow control 52; TCP optimization 54; content inspection 56; compression 58; data caching 60; route optimization 62; and, encryption 64.

By applying these plurality of traffic management elements to the AFE 25 and AIG 35 the present invention provides the advantage of inter alia having a coherent traffic management layer that augments traffic managers by distributing core management functions to the AFEs 25 and the AIGs 35 at network 10 access points. This allows providers to be able to establish a single policy guiding bandwidth allocation across all the devices (e.g., 10, 20, 30, etc.) in the network system 80. By eliminating all but the necessary application processes from running on the application servers 23, (FIG. 1) the provider is able to maximize server 23 responsiveness. Thus, these various traffic management functions are removed and freed from the servers 23 and placed elsewhere (i.e., at AFE 25 and/or AIG 35).

Traffic flow control 52 includes two mechanisms including IP (Internet Protocol) queuing and TCP (Transmission Control Protocol) rate control. This will aid in the partitioning of bandwidth as IP flow moves from any local area network ("LAN") to any network 10 (e.g., WAN). IP queuing identifies traffic and places it in various logical queues. This assist in prioritizing the traffic as it moves on the network 10.

TCP optimization 54 includes various methods to reduce the amount of traffic or refine the way it's sent across the network 10. Within the data center 21 (FIG. 2), AFE 25 off-loads the TCP handshaking sequence in setting up client connections from the server 23. By providing a TCP proxy function, the traffic manager performs local acknowledgements, reducing TCP overhead across the network 10. This proxy function also lets traffic managers break up or combine packets depending on application requirements. For example, VoIP is sensitive to latency, so having smaller packet sizes improves quality. Contrastingly, larger packets and local acknowledgements improve performance over higher latency connections (e.g., satellite offices). TCP multiplexing may be employed wherein packet transmission is spread across multiple persistent connection or tunnel across the network 10. Per-packet connection maintenance for each conversation is thereby reduced.

Content inspection 56 includes providing the ability for the AIG 35 to proxy browser 33, IM, and e-mail connections in the system 80, inspect the content embedded within, than take action based on the customer's policies. This will improve traffic flow across the network 10. This can also include web filtering and content management. Both involve HyperText Transport Protocol ("HTTP") proxy function. Web filtering includes terminating HTTP connection request and checks the destination Uniform Resource Locator ("URL") against a database to either allow or block the request. Conversely, content management examines the content in "real time" vs. a plurality of use-defined criteria.

Compression 58 includes addressing the current problem wherein, although nearly all browsers support HTTP compression for web traffic (formalized in HTTP 1.1), most Web servers run with compression deactivated due to concern about using precious server cycles. Most traffic managers currently implement proprietary "two-sided" compression solutions from box to box to deliver optimized traffic across WAN facilities. By applying compression 58 to both the AFE 25 and AIG 35, the AFE 25 is able to implement one-sided HTTP compression, thereby reducing HTML traffic by about 70 percent (i.e., with appliances on both sides of the connection).

Data caching 60 includes improving performance by reducing the repetitive transmission of various Web elements such as HyperText Markup Language ("HTML") content, similar to a browser's built-in cache, but for a plurality, or community, of users. While compression uses some form of caching, data caching 60 can store larger amounts of data. For example, a data caching implementation may use a 256 Gbyte hard drive as its data cache, as compared to typical compression cashes that run on about 1 Gbyte of RAM.

Route optimization 62 includes various traffic management products and methods that direct Internet traffic over routes for either performance or cost reasons. By knowing alternative paths through the network 10 for various traffic types affords customers and providers the option of using either private or Internet services for application delivery. Thus, the traffic manager, or AIG 35, can direct critical customer transactions across the VPN and less-critical e-mail across the Internet.

Encryption 64 includes encrypting data from the server 23 to the client site 30. One aspect of encryption 64 is where the AFE 25 forms a boundary between the customer 30 and the server 23 thereby securing HTTPS connections between AFE 25 and client browsers 33. Additionally, AFE 25 may terminate Secure Sockets Layer ("SSL") VPN connections.

The present invention ultimately provides the ability to manage and deliver application performance over a network 10, such as a WAN.

Figure 4:
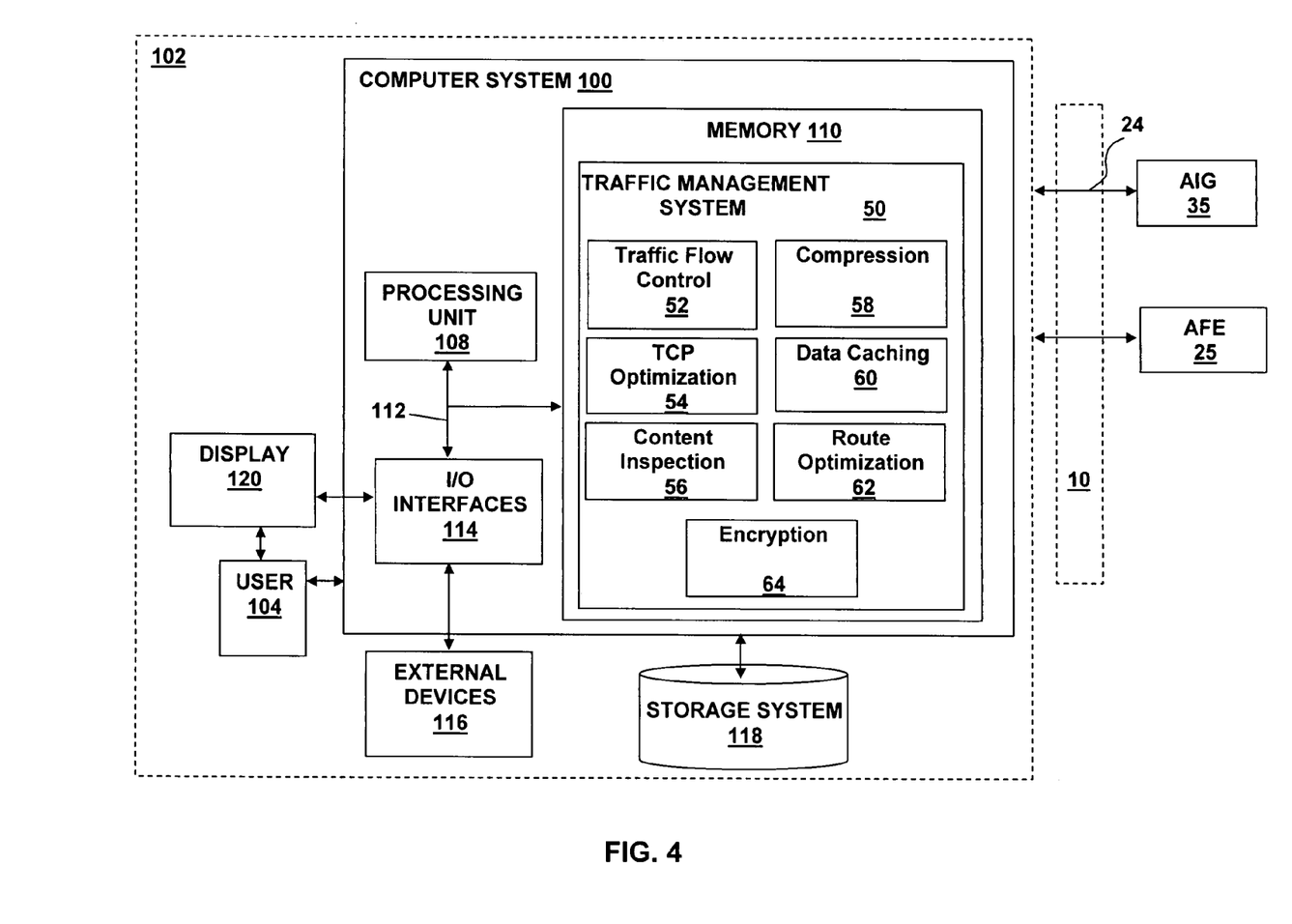
FIG. 4 depicts an illustrative computer system for implementing embodiment(s) of the present invention.

A computer system 100 for providing a network-based application strategy to a customer in accordance with an embodiment of the present invention is depicted in FIG. 4. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides a service for providing a network-based application to a customer in accordance with the present invention. It should be appreciated that a user 104 can access computer system 100 directly, or can operate a computer system that communicates with computer system 100 over a network 10 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as traffic management system 50, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 10) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 4 can be included in computer system 100. However, if computer system 100 comprises a handheld device or the like, it is understood that one or more external devices/resources 116 (e.g., display 120) and/or one or more storage system(s) 118 can be contained within computer system 100, and not externally as shown.

Storage system(s) 118 can be any type of system (e.g., a database) capable of providing storage for information under the present invention. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as a computer program product) is a traffic management system 50 for providing a network-based application strategy to a customer in accordance with embodiment(s) of the present invention. The traffic management system 50 generally includes traffic flow control 52 for partitioning bandwidth of the IP (traffic) flow, TCP Optimization 54 for optimizing the TCP across the network, content inspection 56 for providing Web filtering and content management functions, and compression 58 for providing HTTP compression, as described above. The traffic management system 50 further includes data caching 60 for storing large amounts of data, route optimization 62 for affording the option to either use private or Internet services for application delivery, and encryption 64 for providing various encryption technologies to the AFE 25, as described above.

The present invention can be offered as a business method on a subscription or fee basis. For example, one or more components of the present invention can be created, maintained, supported, and/or deployed by a service provider that offers the functions described herein for customers. That is, a service provider can be used to provide a service for providing a network-based application strategy to a customer, as described above.

It should also be understood that the present invention can be realized in hardware, software, a propagated signal, or any combination thereof. Any kind of computer/server system (s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk-read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for providing a network-based application to a customer, comprising:
   providing an application at a service provider site, the site including an application front end (AFE);
   providing access over a network to the application for at least one customer, located at a customer site, the customer site including an application internet gateway (AIG); and
   using a traffic management system to perform a plurality of traffic management functions at each of the AFE and the AIG, the traffic management system being distinct from and in communication with the AFE and the AIG, wherein the traffic management system maximizes an application server response time by distributing the plurality of traffic management functions to each of the AFE and the AIG based on a predetermined set of requirements for the AFE.

2. The method of claim 1, wherein the network is one selected from the group of a virtual private network (VPN), a wide-area network (WAN), and combinations thereof, and wherein the traffic management system is implemented on a system distinct from the service provider site and the customer site.

3. The method of claim 1, wherein the service provider site includes a plurality of web servers.

4. The method of claim 1, wherein the plurality of traffic management functions are selected from a group consisting of: traffic flow control, Transmission Control Protocol (TCP) optimization, content inspection, compression, data caching, route optimization, encryption, and combinations thereof.

5. A system for providing a network-based application to a customer, comprising:
   a system for providing an application at a service provider site, the site including an application front end (AFE);
   a system for providing access over a network to the application for at least one customer, located at a customer site, the customer site including an application internet gateway (AIG); and
   a traffic management system for performing a plurality of traffic management functions at each of the AFE and the AIG, the traffic management system being distinct from and in communication with the AFE and the AIG, wherein the traffic management system maximizes an application server response time by distributing the plurality of traffic management functions to each of the AFE and the AIG based on a predetermined set of requirements for the AFE.

6. The system of claim 5, wherein the network is one selected from the group of a virtual private network (VPN), a wide-area network (WAN), and combinations thereof, and wherein the traffic management system is implemented on a system distinct from the service provider site and the customer site.

7. The system of claim 5, wherein the service provider site includes a plurality of web servers.

8. The system of claim 5, wherein the plurality of traffic management functions are selected from a group consisting of: traffic flow control, Transmission Control Protocol (TCP) optimization, content inspection, compression, data caching, route optimization, encryption, and combinations thereof.

9. A program product stored on a non-transitory computer readable medium for providing a network-based application to a customer, the non-transitory computer readable medium comprising program code for performing the steps of:
 providing an application at a service provider site, the site including an application front end (AFE);
 providing access over a network to the application for at least one customer, located at a customer site, the customer site including an application internet gateway (AIG); and
 using a traffic management system to perform a plurality of traffic management functions at each of the AFE and the AIG, the traffic management system being distinct from and in communication with the AFE and the AIG, wherein the traffic management system maximizes an application server response time by distributing the plurality of traffic management functions to each of the AFE and the AIG based on a predetermined set of requirements for the AFE.

10. The program product of claim 9, wherein the network is one selected from the group of a virtual private network (VPN), a wide-area network (WAN), and combinations thereof, and wherein the traffic management system is implemented on a system distinct from the service provider site and the customer site.

11. The program product of claim 9, wherein the service provider site includes a plurality of web servers.

12. The program product of claim 9, wherein the plurality of traffic management functions are selected from a group consisting of: traffic flow control, Transmission Control Protocol (TCP) optimization, content inspection, compression, data caching, route optimization, encryption, and combinations thereof.

13. A method for deploying an application for providing a network-based application to a customer, comprising:
 providing a computer infrastructure being operable to:
 provide an application at a service provider site, the site including an application front end (AFE);
 provide access over a network to the application for at least one customer, located at a customer site, the customer site including an application internet gateway (AIG); and
 use a traffic management system to perform a plurality of traffic management functions at each of the AFE and the AIG, the traffic management system being distinct from and in communication with the AFE and the AIG, wherein the traffic management system maximizes an application server response time by distributing the plurality of traffic management functions to each of the AFE and the AIG based on a predetermined set of requirements for the AFE.

14. The method of claim 13, wherein the network is one selected from the group of a virtual private network (VPN), a wide-area network (WAN), and combinations thereof, and wherein the traffic management system is implemented on a system distinct from the service provider site and the customer site.

15. The method of claim 13, wherein the service provider site includes a plurality of web servers.

16. The method of claim 13, wherein the plurality of traffic management functions are selected from a group consisting of: traffic flow control, Transmission Control Protocol (TCP) optimization, content inspection, compression, data caching, route optimization, encryption, and combinations thereof.

* * * * *